(12) United States Patent
Lee

(10) Patent No.: US 11,029,867 B2
(45) Date of Patent: Jun. 8, 2021

(54) APPARATUS AND METHOD FOR TRANSMITTING MAP INFORMATION AND READ COUNT IN MEMORY SYSTEM

(71) Applicant: SK hynix Inc., Icheon (KR)

(72) Inventor: Jong-Hwan Lee, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/732,958

(22) Filed: Jan. 2, 2020

(65) Prior Publication Data

US 2021/0004167 A1    Jan. 7, 2021

(30) Foreign Application Priority Data

Jul. 4, 2019   (KR) .......................... 10-2019-0080573

(51) Int. Cl.
G06F 3/06    (2006.01)

(52) U.S. Cl.
CPC ............ *G06F 3/0631* (2013.01); *G06F 3/061* (2013.01); *G06F 3/064* (2013.01); *G06F 3/0653* (2013.01); *G06F 3/0659* (2013.01); *G06F 3/0679* (2013.01)

(58) Field of Classification Search
CPC ........ G06F 3/061; G06F 3/0631; G06F 3/064; G06F 3/0653; G06F 3/0659; G06F 3/0679
See application file for complete search history.

(56) References Cited

U.S. PATENT DOCUMENTS

| | | | |
|---|---|---|---|
| 5,459,850 A * | 10/1995 | Clay | G06F 3/0601 703/24 |
| 9,164,888 B2 | 10/2015 | Borchers et al. | |
| 9,195,396 B2 | 11/2015 | Peterson et al. | |
| 9,378,135 B2 | 6/2016 | Bennett | |
| 9,400,749 B1 | 7/2016 | Kuzmin et al. | |
| 10,108,366 B2 | 10/2018 | Huang et al. | |
| 10,126,982 B1 | 11/2018 | Colgrove et al. | |
| 2008/0313405 A1 * | 12/2008 | Sakata | G06F 12/0822 711/122 |
| 2010/0185883 A1 | 7/2010 | Hamilton | |

(Continued)

FOREIGN PATENT DOCUMENTS

| KR | 101366960 B1 | 2/2014 |
|---|---|---|
| KR | 1020150114958 A | 10/2015 |

(Continued)

OTHER PUBLICATIONS

Jeong et al., "Improving Flash Storage Performance by Caching Address Mapping Table in Host Memory", HotStorage '17, Jul. 12-14, 2017, Santa Clara, CA.

(Continued)

*Primary Examiner* — Larry T MacKall

(57) ABSTRACT

A memory system may include: a nonvolatile memory device including a plurality of memory blocks; and a controller for reading data stored in a physical address in response to a read command from a host, the read command including a first logical address, a first physical address corresponding to the first logical address, and a first read count associated with the first physical address, the controller may read first data from a first block corresponding to the first physical address and sends a response to the read command to the host, the response including the first data and updated information relating to the first read count.

20 Claims, 11 Drawing Sheets

(56) References Cited

U.S. PATENT DOCUMENTS

| | | |
|---|---|---|
| 2011/0231623 A1 | 9/2011 | Goss et al. |
| 2014/0089761 A1* | 3/2014 | Kwok ................. G06F 11/1048 |
| | | 714/768 |
| 2014/0244897 A1 | 8/2014 | Goss et al. |
| 2016/0259723 A1 | 9/2016 | Lee et al. |
| 2016/0299715 A1 | 10/2016 | Hashimoto et al. |
| 2016/0342509 A1 | 11/2016 | Kotte et al. |
| 2017/0083436 A1 | 3/2017 | Jung |
| 2017/0192902 A1* | 7/2017 | Hwang ............... G06F 12/0246 |
| 2018/0004413 A1 | 1/2018 | Zhang |
| 2018/0275873 A1 | 9/2018 | Frid et al. |
| 2018/0322042 A1 | 11/2018 | Jang |
| 2019/0089383 A1 | 3/2019 | Funaoka et al. |
| 2019/0102291 A1 | 4/2019 | Zhou |
| 2019/0227929 A1 | 7/2019 | Lin et al. |
| 2019/0266079 A1 | 8/2019 | Raviraj et al. |
| 2019/0332542 A1 | 10/2019 | Li et al. |
| 2020/0151108 A1 | 5/2020 | Yen et al. |
| 2020/0210344 A1 | 7/2020 | Manganelli et al. |

FOREIGN PATENT DOCUMENTS

| | | |
|---|---|---|
| KR | 101631039 B1 | 6/2016 |
| KR | 1020170002866 A | 1/2017 |
| KR | 1020170005915 A | 1/2017 |
| KR | 101736647 B1 | 5/2017 |
| KR | 101867487 B1 | 7/2018 |
| KR | 1020200116704 A | 10/2020 |
| WO | WO2014120698 A1 | 8/2014 |

OTHER PUBLICATIONS

Office Action dated Mar. 16, 2021 for U.S. Appl. No. 16/707,851.
Office Action dated Nov. 13, 2020 for U.S. Appl. No. 16/599,870.
Office Action dated Mar. 19, 2021 for related U.S. Appl. No. 16/838,567.
Office Action dated Apr. 1, 2021 for U.S. Appl. No. 16/721,716.

* cited by examiner

APPARATUS AND METHOD FOR TRANSMITTING MAP INFORMATION AND READ COUNT IN MEMORY SYSTEM

CROSS-REFERENCE TO RELATED APPLICATION

This application claims priority under 35 U.S.C. § 119 to Korean Patent Application No. 10-2019-0080573 filed on Jul. 4, 2019, which is incorporated herein by reference in its entirety.

BACKGROUND

1. Field

Exemplary embodiments relate to a memory system, and more particularly, to an apparatus for transmitting map information and a read count to a host or computing device in a memory system included in a data processing system.

2. Discussion of the Related Art

Recently, a paradigm for a computing environment has shifted to ubiquitous computing, which enables computer systems to be accessed virtually anytime and everywhere. As a result, the use of portable electronic devices, such as mobile phones, digital cameras, notebook computers, and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a nonvolatile semiconductor memory device has excellent stability and durability because it has no mechanical driving parts (e.g., a mechanical arm), and has high data access speed and low power consumption. In the context of a memory system having such advantages, an exemplary data storage device includes a USB (Universal Serial Bus) memory device, a memory card having various interfaces, a solid state drive (SSD), or the like.

SUMMARY

Various embodiments are directed to a data processing system for transmitting data between components in the data processing system including components or resources such as a memory system and a host.

Also, various embodiments are directed to an apparatus which can transmit map information and a read count to a host or computing device in a memory system within a data processing system, and control the host or computing device to transmit a command including the map information and the read count to the memory system, thereby improving the operation performance of the memory system.

Also, various embodiments are directed to an apparatus which can transmit map information and a read count corresponding to the map information to a host or computing device in a memory system within a data processing system such that the host or computing device can manage the read count, and maintains the read count of the memory system in a valid state even when a sudden power-off (SPO) occurs in the memory system, thereby improving the operation performance of the memory system.

Technical objects of the present disclosure are not limited to the above-described technical objects, and other technical objects which are not described herein will be clearly understood by those skilled in the art to which the present disclosure pertains, based on the following descriptions.

In an embodiment, a memory system may include: a nonvolatile memory device including a plurality of memory blocks; and a controller for reading data stored in a physical address in response to a read command from a host, the read command including a first logical address, a first physical address corresponding to the first logical address, and a first read count associated with the first physical address, the controller may read first data from a first block corresponding to the first physical address and sends a response to the read command to the host, the response including the first data and updated information relating to the first read count.

When the first physical address is valid, the controller may read the first data from the first block corresponding to the first physical address, when the first physical address is invalid, the controller may discard the first physical address and the first read count, may search a second physical address corresponding to the first logical address, may read second data from a second block corresponding to the second physical address, may generate a second read count by updating a read count of the second block, and may send a response to the read command to the host, the response including the second data, the second read count and updated map information obtained by associating the first logical address with the second physical address.

The updated information may be a value of the first read count that is increased.

The updated information may be a code indicating that a value of the first read count has increased.

When a write command with a second logical address and write data is received from the host, the controller may generate first map information by associating the second logical address with a physical address for storing the write data, and may send second map information of the first map information and a read count of a memory block corresponding to the second map information to the host in response to a map transfer command from the host.

The controller may search the second physical address corresponding to the first logical address by referring to the first map information, the second physical address not being included in the second map information.

The controller may update the first read count in response to reading of the first data from the first block, and may apply the updated first read count to the read count of the first block.

In an embodiment, a data processing system may include: a host for sending a read command including a first read count and a first physical address corresponding to a first logical address; and a memory system including a nonvolatile memory device having a plurality of memory blocks, the memory system being configured to read data from a physical address in response to a read command from a host, the read command including a first logical address, a first physical address corresponding to the first logical address, and a first read count associated with the first physical address, the memory system may read first data from a first block corresponding to the first physical address and may send a response to the read command to the host, the response including the first data and updated information of the first read count.

When the first physical address is valid, the memory system may read the first data from the first block corresponding to the first physical address, when the first physical address is invalid, the memory system may discard the first physical address and the first read count, may search a second physical address corresponding to the first logical address, may read second data from a second block corresponding to the second physical address, may generate a second read count by updating a read count of the second block, and may send a response to the read command to the host, the response including the second data, the second read count and updated map information obtained by associating the first logical address with the second physical address.

When a write command with a second logical address and write data is received from the host, the memory system may generate first map information by associating the second logical address with a physical address for storing the write data, and may send at least a portion of second map information of the first map information and a read count of a memory block corresponding to the second map information to the host in response to a map transfer command from the host.

When the first physical address is valid, the memory system may read the first data from the first block corresponding to the first physical address, and when the first physical address is invalid, the memory system may discard the first physical address and the first read count, may search a second physical address corresponding to the first logical address by referring to the first map information, may read second data from a second block corresponding to the second physical address, may generate a second read count by updating a read count of the second block, and may include the second data, the second read count, and updated map information obtained by associating the first logical address with the second physical address in the response to the read command and sends the response with the second data, the second read count and the updated map information to the host.

The host may include an internal memory, the host configured to generate the map transfer command, may send the map transfer command to the memory system, and may store, in the internal memory, the second map information included in a response to the map transfer command received from the memory system and the read count of the memory block corresponding to the second map information.

The updated information may be the value of the first read count that is increased in response to performing the read command in the memory system, and the host may select the first logical address, the first physical address and the first read count by referring to the second map information stored in the internal memory, may send the read command with the first logical address, the first physical address and the first read count to the memory system, and may change the value of the first read count corresponding to the first physical address stored in the internal memory into the updated information, when the first data and the updated information are included in the response to the read command from the memory system.

The updated information may be a code for informing the host that the value of the first read count has been increased in response to performing the read command in the memory system, and the host may select the first logical address, the first physical address and the first read count by referring to the second map information stored in the internal memory, may send the read command with the first logical address, the first physical address and the first read count to the memory system, and may increase the value of the first read count corresponding to the first physical address stored in the internal memory by a value corresponding to the updated information, when the first data and the updated information are included in the response to the read command received from the memory system.

The host may select the first logical address, the first physical address and the first read count by referring to the second map information stored in the internal memory, may send the read command with the first logical address, the first physical address and the first read count to the memory system, and may update the second map information stored in the internal memory by referring to the updated map information, such that the first logical address is associated with the second physical address, when the second data, the second read count and the updated map information are included in the response to the read command received from the memory system, and may associate the second read count with the second physical address and stores the second read count in the internal memory.

The memory block may include a plurality of pages, and a physical address of the nonvolatile memory device may include a block physical address for identifying the memory block and a page physical address for identifying the page, and the host may generate read count information for managing the read count of the memory block by referring to a block physical address included in a physical address of the second map information stored in the internal memory, and may store the generated read count information in the internal memory.

The memory system may update the first read count in response to reading of the first data from the first block, and may apply the updated first read count to the read count of the first block.

In an embodiment, a method for operating a memory system, the method may include: reading data from a block in a non-volatile memory device in response to a read command received from a host, the read command including a first logical address, a first physical address, and a first read count associated with the first physical address; and sending a response to the read command to the host, the response including the data and information associated with a read count for the block.

The method may further include: determining whether the first physical address is valid, when the first physical address is valid, the data included in the response may be first data read from a first block corresponding to the first physical address, and the information may be updated information relating to the first read count.

When the first physical address is invalid, the method may further include: searching for a second physical address corresponding to the first logical address; reading second data from a second block corresponding to the second physical address; and generating a second read count by updating a read count of the second block, the data included in the response may be the second data read from the second block and the information is the second read count, the response further including map information obtained by associating the first logical address with the second physical address.

The method may further include: generating first map information by associating a second logical address with a physical address of the nonvolatile memory device for storing write data in response to a write command from the host, the write command including the second logical address and the write data; and sending some second map information of the first map information and a read count of a memory block corresponding to the second map information to the host in response to a map transfer command from the host.

The information may be a value of the first read count that is increased.

The information may be a code informing the host that a value of the first read count has been increased.

The memory system may search the second physical address corresponding to the first logical address by referring to the first map information, the second physical address not being included in the second map information.

The method may further include updating the first read count and applying the updated first read count to the read count of the first block.

DETAILED DESCRIPTION

Figure 1A:
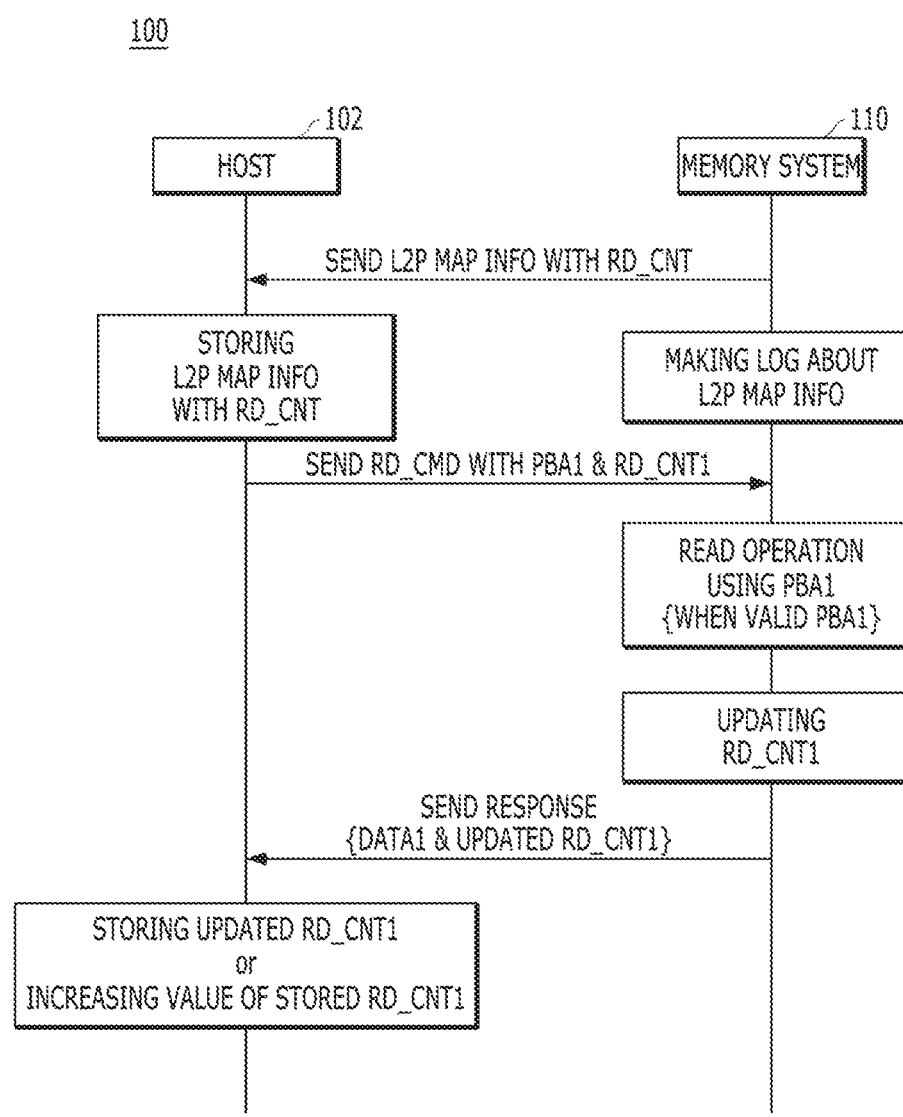
FIGS. 1A and 1B are diagram for describing a method for sharing map information and a read count in accordance with an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1B:
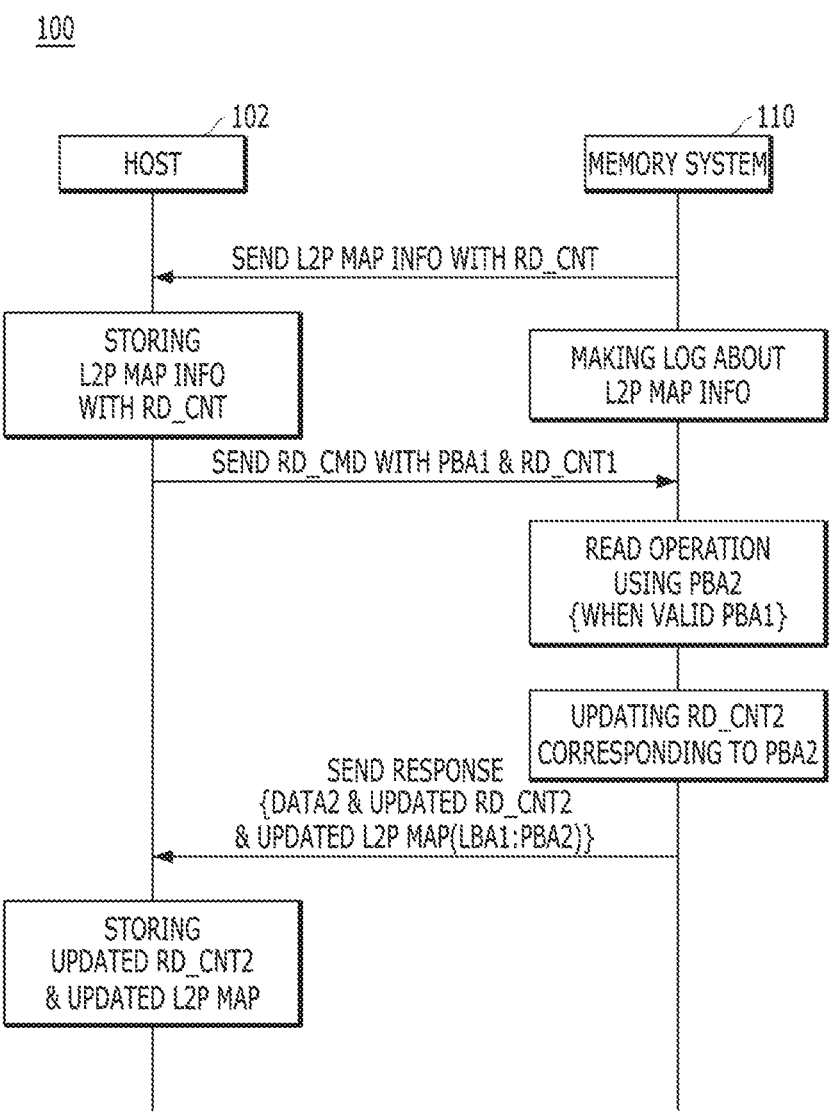

FIGS. 1A and 1B are diagram for describing a method for sharing map information and a read count in accordance with an embodiment.

Referring to FIG. 1A, a host 102 and a memory system 110 may be engaged operatively. The host 102 may include a computing device and may be implemented in a form of a mobile device, a computer, a server, or the like. The memory system 110 operatively engaged with the host 102 may receive a command from the host 102 and store or output data in response to the received command.

The memory system 110 may have a storage space including nonvolatile memory cells. For example, the memory system 110 may be implemented in a form of a flash memory, a solid-state drive (SSD), or the like.

In order to store data in a storage space in response to a request by the host 102, the memory system 110 may perform a mapping operation for associating a file system used by the host 102 with the storage space including the nonvolatile memory cells. This can be referred as to an address translation between a logical address and a physical address. For example, an address identifying data according to the file system used by the host 102 may be called a logical address or a logical block address, and the address indicating a physical location of data in the storage space including nonvolatile memory cells may be referred to as a physical address or a physical block address. When the host 102 sends a read command with a logical address to the memory system 110, the memory system 110 searches for a physical address corresponding to the logical address and reads (or outputs) data stored in a physical location indicated by the physical address. During this process, the mapping operation or the address translation may be performed while the memory system 110 searches for the physical address corresponding to the logical address received from the host 102. The mapping operation or the address translation may be performed based on mapping information such as a mapping table that associates a logical address to a physical address.

However, if the host 102 performs the mapping operation performed by the memory system 110, an amount of time taken for the memory system 110 to read and output data corresponding to a read command transmitted by the host 102 could be reduced. The host 102 may store and access at least some portion of the map information to perform the mapping operation, in order to deliver the read command with the physical address to the memory system 110 through the mapping operation.

The nonvolatile memory device may include a plurality of memory blocks each having a plurality of pages. The memory system 110 may perform a read/write operation on the nonvolatile memory device on a page basis, and perform an erase operation on a block basis. The memory system 110 may generate read/write/erase count data which are computed on a block basis, in order to manage the reliability and lifetime of the nonvolatile memory device. At this time, since the write/erase count may be programmed to the nonvolatile memory device substantially at the same time when a write/erase operation is performed, an accurate value of the write/erase count can be retained without a relatively large difference even when a sudden power off (SPO) occurs in the memory system 110. However, since the read count may be programmed to the nonvolatile memory device at a separate check point that may be significantly different from when a read operation is performed, the read count could be lost when an SPO occurs. In the related art, the read count values of the memory blocks are randomly increased when an SPO occurs, which could result in a significantly inaccurate read count.

Referring to FIGS. 1A and 1B, the memory system 110 may transmit a map information MAP_INFO and a read count RD_CNT to the host 102. The host 102 may store the map information MAP_INFO and the read count RD_CNT in a memory included in the host 102. When the memory system 110 sends the entire map information and the entire read count to the host 102 and the host 102 can store these in its memory, the memory system 110 may not need to write a log regarding transmitted map information. However, if the host 102 is not able to allocate a sufficient memory space for the entire map information, the memory system 110 may selectively transmit, to the host 102, map information on data or a logical address which is frequently used by the host 102 and a read count corresponding to that selected map information.

Meanwhile, the memory system 110 transmitting at least some of the map information and the read count to the host 102 may generate a log or a history regarding the transmitted map information. The log or a history may have one of various formats, structures, marks, variables or types, and may be stored in a memory device or a storage area including nonvolatile memory cells. In an embodiment, whenever the memory system 110 transmits the map information and the read count to the host 102, the log or the history may include a kind of data which is relevant to transmitted map information. Here, since the read count transmitted to the host 102 from the memory system 110 is associated with the map information, a separate log does not need to be made. Further, the memory system 110 may determine an amount of transmitted map information recorded in the log or the history corresponding to a size of map information that can be transmitted to the host 102. For example, it may be assumed that a size of map information that the memory system 110 can transmit to the host 102 is 512 KB. Although the memory system 110 may transmit more than 512 KB of map information to the host 102 in a log or a history, the amount of transmitted map information recorded in the log or the history may be limited to 512 KB. The amount of map information that memory system 110 can send to host 102 at one time may be less than the amount of map information that host 102 may store in the memory. For example, the map information and the read count may be transmitted to the host 102 in a segment unit. The memory system 110 may transfer segments of the map information and the read count to the host 102 multiple times, and the segments of the map information and the read count may be transmitted to the host 102 continuously or intermittently.

In an embodiment, when the memory system 110 transmits more than a given size (e.g., 1 MB) of map information and read count to the host 102, the host 102 can delete the map information and the read count previously received from the memory system 110 according to a timeline (e.g., the older information is deleted first). In addition, the map information and the read count output by the memory system 110 to the host 102 may include update information. Because a space allocated by the host 102 to store the map information and the read count transmitted from the memory system 110 includes volatile memory cells (an overwrite is supported), the host 102 can update map information and read count based on the update information without an additional operation of erasing another map information and anther read count.

The host 102 may add a physical address PBA and the read count RD_CNT into a command transmitted to the memory system 110 based on the map information and the read count. In the mapping operation, the host 102 searches for the physical address PBA1 corresponding to a logical address in the map information stored in the memory. When the physical address PBA1 is located, the host 102 retrieves its read count RD_CNT1. Once the physical address PBA1 and the read count RD_CNT1 have been found, the host 102 transmits the command with the logical address, the physical address PBA1 and the read count RD_CNT1 to the memory system 110.

More specifically, referring to FIG. 1A, the host 102 may generate a map transfer command, receive map information L2P MAP INFO and a read count RD_CNT of a memory block corresponding to the map information L2P MAP INFO from the memory system 110, and store the map information L2P MAP INFO and the read count RD_CNT in an internal memory. At this time, the memory system 110 may generate a log corresponding to the map information L2P MAP INFO sent to the host 102. The map transfer command generated by the host 102 may not be specifically limited. That is, a specific command predefined between the host 102 and the memory system 110 or a command used already therebetween may be used as the map transfer command. For example, the host 102 may generate a write command as the map transfer command and transmit the write command to the memory system 110, and the memory system 110 may recognize the write command as the map transfer command, and send the map information L2P MAP INFO and the read count RD_CNT of the memory block corresponding to the map information L2P MAP INFO to the host 102 in response to the write command. The host 102 may send a read command RD_CMD with a first logical address, a first physical address PBA1 and a first read count RD_CNT1 to the memory system 110 by referring to the map information L2P MAP INFO stored therein.

When the first logical address, the first physical address PBA1 and the first read count RD_CNT1 are included in the read command RD_CMD from the host 102, the memory system 110 may check whether the first physical address PBA1 is valid. When the first physical address PBA1 is valid (WHEN VALID PBA1), the memory system 110 may read first data DATA1 from a first memory block corresponding to the first physical address PBA1. At this time, since the first physical address PBA1 is a valid physical address, the first read count RD_CNT1 is an accurate read count for the first memory block. Therefore, the memory system 110 may update the first read count RD_CNT1 in response to the read operation for the first data DATA1, and apply the updated first read count RD_CNT1 as the new read count for the first memory block. The memory system 110 may include the first data DATA1 and the updated value UPDATED of the first read count RD_CNT1 in a response to the read command RD_CMD, and send the response with the first data DATA1 and the updated value UPDATED of the read count RD_CNT1 to the host 102.

The updated value UPDATED of the first read count RD_CNT1 sent to the host 102 by the memory system 110 may be generated through a number of different methods according to a protocol with the host 102.

A first method can be described with reference to FIGS. 1A and 7A. The updated value UPDATED of the first read count RD_CNT1 may be obtained by increasing the value of the first read count RD_CNT1 by a preset value. For example, when the value of the first read count RD_CNT1 received is 10, the memory system 110 may increase the value of the first read count RD_CNT1 by a preset value of 1, making the updated value to 11. The updated value UPDATED of the first read count RD_CNT1 is sent to the host 102 as part of a response to the read commend RD_CMD by the memory system 110.

The host 120 may store the updated value UPDATED of the first read count RD_CNT1 received in response to the read command RD_CMD in the internal memory (STORING UPDATED RD_CNT1). For example, the host 102 may change the first read count RD_CNT1 having a value of 10 to 11.

A second method can be described with reference to FIGS. 1A and 7B. A code value for increasing the value of the first read count RD_CNT1 by a preset value may be applied.

For example, when the value of the first read count RD_CNT1 received from the host 102 is 10 and needs to be increased by a preset value of 1, the memory system 110 may generate the updated value UPDATED of the first read count RD_CNT1 as a value of 1. The memory system 110 may include the updated value UPDATED of the first read count RD_CNT1 in a response to the read command RD_CMD with the first data DATA1, and send the response with the first data DATA1 and the updated value UPDATED.

When the updated value UPDATED of the first read count RD_CNT1, generated through the second method, is received in the response of the read command RD_CMD, the host 120 may increase the value of the first read count RD_CNT1 stored in the internal memory using the updated value UPDATED of the first read count RD_CNT1 (IN-CREASING VALUE OF STORED RD_CNT1). For example, the host 102 may increment the first read count RD_CNT1 having a value of 10 stored in the internal memory with the updated value UPDATE of 1 received from the memory system 110, thereby changing the value of the first read count RD_CNT1 to 11.

When a predetermined operation PREDETERMINED OPERATION is performed in a memory system 110, some map information SOME L2P MAP INFO managed in the memory system 110 may be updated. Although the some map information (or the selected map information) was updated through the predetermined operation in the memory system 110, the host 102 may not know about the update until the memory system 110 informs the host 102 of the update. Therefore, the selected map information stored in the host 102 may become outdated map information. That is, when the host 102 transfers the physical address PBA2 corresponding to the read command as described above, the memory system 110 cannot use the physical address received from the host 102 as it is, if the transferred physical address corresponds to the updated map information in the memory system 110. Instead, the memory system 110 may search for a new physical address again, and access and output data using the new physical address. In this case, although the physical address was provided to the memory system 110 by the host 102, a time t2 required to perform an operation corresponding to the read command in the memory system 110 may be significantly increased.

Referring to FIG. 1B, the host 102 may receive map information L2P MAP INFO and a read count RD_CNT of a memory block corresponding to the map information L2P MAP INFO from the memory system 110, and store the map information L2P MAP INFO and the read count RD_CNT in the internal memory. At this time, the memory system 110 may generate a log corresponding to the map information L2P MAP INFO sent to the host 102.

The host 102 may send the read command RD_CMD with a first logical address, a first physical address PBA1 and a first read count RD_CNT1 to the memory system 110 by referring to the map information L2P MAP INFO stored therein.

The memory system 110 may check whether the first physical address PBA1 is valid after receiving the read command RD_CMD. If the first physical address PBA1 is invalid (WHEN INVALID PBA1), the first read count RD_CNT1 corresponding to the first physical address PBA1 may also be invalid. Therefore, when the first physical address PBA1 is invalid (WHEN INVALID PBA1), the memory system 110 may discard the first physical address PBA1 and the first read count RD_CNT1 corresponding to the first physical address PBA1, and search for a second physical address PBA2 corresponding to the first logical address. The memory system 110 may read second data DATA2 from a second memory block corresponding to the second physical address PBA2 using the second physical address PBA2. The memory system 110 may generate a second read count RD_CNT2 by updating a read count corresponding to the second memory block. That is, the memory system 110 may discard the first read count RD_CNT1 received from the host 102, and generate the second read count RD_CNT2 using a read count corresponding to the second memory block, which has been managed in the memory system 110. The memory system 110 may send a response to the read command RD_CMD to the host 102, where the response includes the second data DATA2, the second read count RD_CNT2 and updated map information UPDATED L2P MAP (LBA1:PBA2). The updated map information UPDATED L2P MAP (LBA1:PBA2) is obtained by associating the first logical address with the second physical address PBA2.

When in the response to the read command RD_CMD is received the host 102 may update the map information stored in the internal memory by referring to the updated map information UPDATED L2P MAP (LBA1:PBA2), so that the first logical address LBA1 is associated with the second physical address PBA2 (UPDATED L2P MAP). Then, the host 102 may match the second read count RD_CNT2 with the second physical address PBA2 and store the second read count RD_CNT2.

Figure 2:
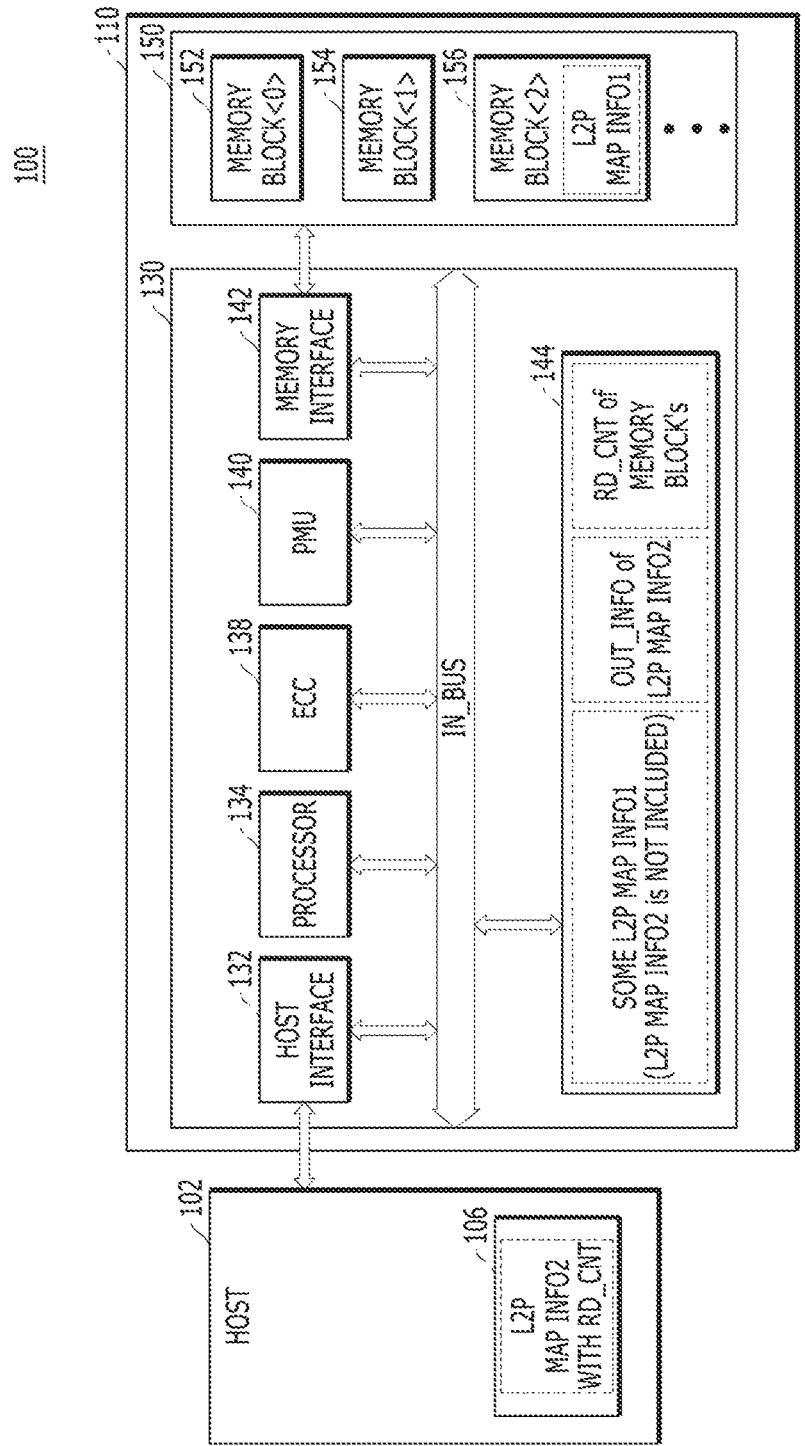
FIG. 2 is a diagram schematically illustrating an example of a data processing system including a memory system in accordance with an embodiment.

FIG. 2 illustrates a data processing system 100 in accordance with an embodiment of the present disclosure. The data processing system 100 may include a host 102 engaged or operating with a memory system 110.

The host 102 may include, for example, a portable electronic device such as a mobile phone, an MP3 player and a laptop computer, or an electronic device such as a desktop computer, a game player, a television (TV), a projector, and the like.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to a user's requests. By the way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as discussed above in the examples.

By the way of example but not limitation, the controller 130 and the memory device 150 may be integrated into a single semiconductor device. The controller 130 and memory device 150 may be integrated into an SSD for improving an operation speed. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may include a nonvolatile memory device and may retain data stored therein even when an electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be embodied in a three-dimensional stack structure.

The controller 130 may control overall operations of the memory device 150, such as read, write, program, and erase operations. For example, the controller 130 may control the memory device 150 in response to a request from the host 102. The controller 130 may provide data, read from the memory device 150, to the host 102. The controller 130 may also store data, provided by the host 102, into the memory device 150.

The controller 130 may include a host interface (I/F) 132, a processor 134, an error correction code (ECC) component 138, a power management unit (PMU) 140, a memory interface (I/F) 142, and memory 144, all operatively coupled via an internal bus. The memory 144 may be volatile or non-volatile memory. In an embodiment, the memory 144 is a volatile memory.

The host interface 132 may process commands and data provided by the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI), and integrated drive electronics (IDE). In accordance with an embodiment, the host interface 132 is a component for exchanging data with the host 102, which may be implemented through firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 might not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include and all circuits, modules, systems or devices for performing the error correction operation based on at least one of the above described codes.

The PMU 140 may manage electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data occurred or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 to perform operations such as read operations or program/write operations.

The memory 144 may be implemented as a volatile memory. The memory 144 may be implemented with a static random access memory (SRAM), a dynamic random access memory (DRAM), or both. Although FIG. 2 illustrates the second memory 144 as being disposed within the controller 130, embodiments are not limited thereto. That is, the memory 144 may be located within or external to the controller 130. For instance, the memory 144 may be embodied by an external volatile memory having a memory interface transferring data and/or signals between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling, and the like. Particularly, the FTL may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to an command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation of copying and storing data stored in a memory block among the memory blocks 152, 154, 156 in the memory device 150 to another memory block, e.g., a garbage collection (GC) operation. The background operation can include an operation of moving or swapping data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands entered from the host 102. For example, when performing a plurality of program operations corresponding to a plurality of program commands, a plurality of read operations corresponding to a plurality of read commands, and a plurality of erase operations corresponding to a plurality of erase commands sequentially, randomly, or alternatively, the controller 130 can determine which channel(s) or way(s) among a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By the way of example but not limitation, the controller 130 can recognize statuses regarding a plurality of channels (or ways) associated with a plurality of memory dies included in the memory device 150. The controller 130 may determine the state of each channel or each way as one of a busy state, a ready state, an active state, an idle state, a normal state, and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Meanwhile, a program operation, a read operation and an erase operation of the controller 130 will be described below.

First, the controller 130 may perform an operation of storing program data corresponding to a program command received from the host 102, in a buffer/cache included in the memory 144 of the controller 130, and then, storing the data stored in the buffer/cache, in the memory blocks 152, 154 and 156 included in the memory device 150. Also, the controller 130 may update map data in correspondence to the program operation to the memory device 150, and then, may store the updated map data in the memory blocks 152, 154 and 156 included in the memory device 150.

Further, in the case where a read command is received from the host 102, the controller 130 may read data corresponding to the read command, from the memory device 150, by checking map data of the data corresponding to the read command, may store the read data in the buffer/cache included in the memory 144 of the controller 130, and then, may provide the data stored in the buffer/cache, to the host 102.

Moreover, in the case where an erase command is received from the host 102, the controller 130 may perform an erase operation of checking a memory block corresponding to the erase command, erasing data stored in the checked memory block, updating map data in correspondence to the erased data and then storing updated map data in the memory blocks 152, 154 and 156 included in the memory device 150.

Map data may include logical/physical (L2P: logical to physical) information and physical/logical (P2L: physical to logical) information on data stored in memory blocks in correspondence to a program operation.

Data corresponding to a command may include user data and metadata. The metadata may include map data generated in the controller 130 in correspondence to that user data is stored in the memory device 150. Also, the metadata may include information on command data corresponding to a command received from the host 102, information on a command operation corresponding to the command, information on the memory blocks of the memory device 150 for which the command operation is to be performed, and information on map data corresponding to the command operation. In other words, the metadata may include information and data for the command operation, except user data corresponding to the command received from the host 102.

That is to say, in the case where a write command is received from the host 102, the controller 130 performs a program operation corresponding to the write command. At this time, the controller 130 may store user data corresponding to the write command, in at least one among the memory blocks 152, 154 and 156 of the memory device 150 (for example, empty memory blocks, open memory blocks or free memory blocks for which an erase operation is performed, among memory blocks). Also, the controller 130 may store logical/physical address information (an L2P map) and physical/logical address information (a P2L map) on the user data stored in memory blocks, in empty memory blocks, open memory blocks or free memory blocks among the memory blocks of the memory device 150, in the form of a map table or a map list.

User data to be stored in the memory device 150 may be divided by the unit of a segment having a preset size. The preset size may be the same as a minimum data size required for the memory system 110 to interoperate with the host 102. According to an embodiment, a size of a data segment as the unit of user data may be determined in correspondence to a configuration and a control method in the memory device 150. While storing data segments of user data in the memory blocks of the memory device 150, the controller 130 may generate or update a map address corresponding to a stored data segment. When meta segments each as the unit of metadata including a map address (for example, logical/physical (L2P) segments and physical/logical (P2L) segments as map segments of map data) are generated by the controller 130 or map segments stored in memory blocks are loaded to the memory 144 and are then updated, the map segments may be stored in the memory blocks of the memory device 150.

Referring to FIGS. 1A, 1B and 2, the memory system 110 may generate first map information L2P MAP INFO1 which maps a physical address of data in the memory device 150 to a logical address received from the host 102. More specifically, when a write command with a second logical address and write data is received from the host 102, the memory system 110 may generate first map information L2P MAP INFO1 to associate the second logical address with a physical address of the memory device 150 in which the write data is stored. The entire first map information L2P MAP INFO1 generated in the memory system 110 may be stored in a memory block MEMORY BLOCK<2> (or in multiple memory blocks) in the memory device 150. The memory block may be non-volatile device and the information may be stored in a nonvolatile state. Also, some of first map information SOME L2P MAP INFO1 (or a portion of first map information) from the entire first map information L2P MAP INFO1 stored in the memory device 150 in the nonvolatile state may be stored in the memory 144 in the controller 130. The memory system 110 may manage the read counts RD_CNT of the memory blocks 152, 154 and 156 included in the nonvolatile memory device 150, and some or all of the read counts may be stored in the memory 144 within the controller 130. Furthermore, some of second map information L2P MAP INFO2 (or a portion of second map information) and read count RD_CNT from the entire first map information L2P MAP INFO1 stored in the memory device 150 in the nonvolatile state may be transmitted to the host 102 and stored in the memory 106 in the host 102. The portion of the first map information SOME L2P MAP INFO1 stored in the memory 144 in the controller 130 and the second map information L2P MAP INFO2 transmitted to the host 102 and stored in the memory 106 in the host 102 may not overlap each other. After transmitting the second map information L2P MAP INFO2 and the read count RD_CNT to the host 102, the controller 130 of the memory system 110 may generate log information OUT_INFO of L2P MAP INFO2 on the second map information L2P MAP INFO2.

FIG. 2 illustrates that the log information OUT_INFO of L2P MAP INFO2 on the second map information L2P MAP INFO2 is stored in the memory 144 in the controller 130, but this merely shown as an example. In practice, the log information OUT_INFO of L2P MAP INFO2 on the second map information L2P MAP INFO2 may be stored in the memory 144 in the controller 130 and at the same time may be stored in a specific memory block of the memory device 150 in a nonvolatile state.

Figure 3:
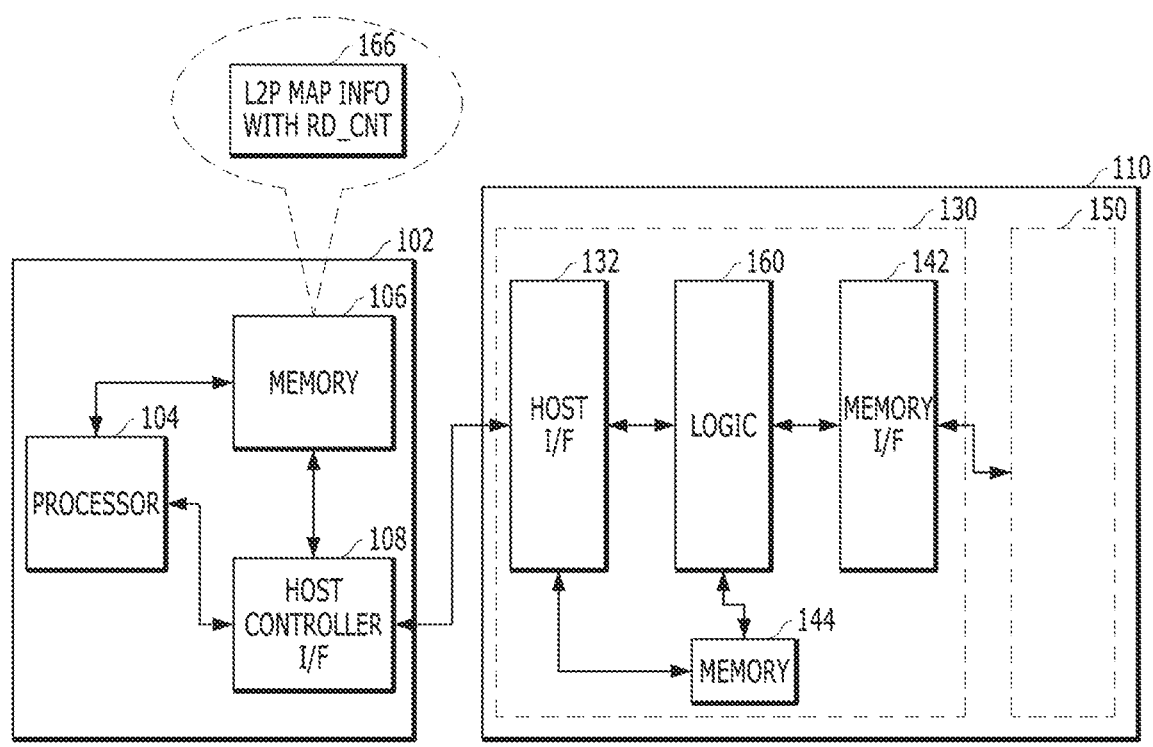
FIG. 3 is a diagram illustrating configurations of a host and the memory system in the data processing system in accordance with the present embodiment.

FIG. 3 is a representation of an example of a diagram to assist in the explanation of the configurations of the host and the memory system in the data processing system in accordance with the embodiment of the disclosure.

Figure 4:
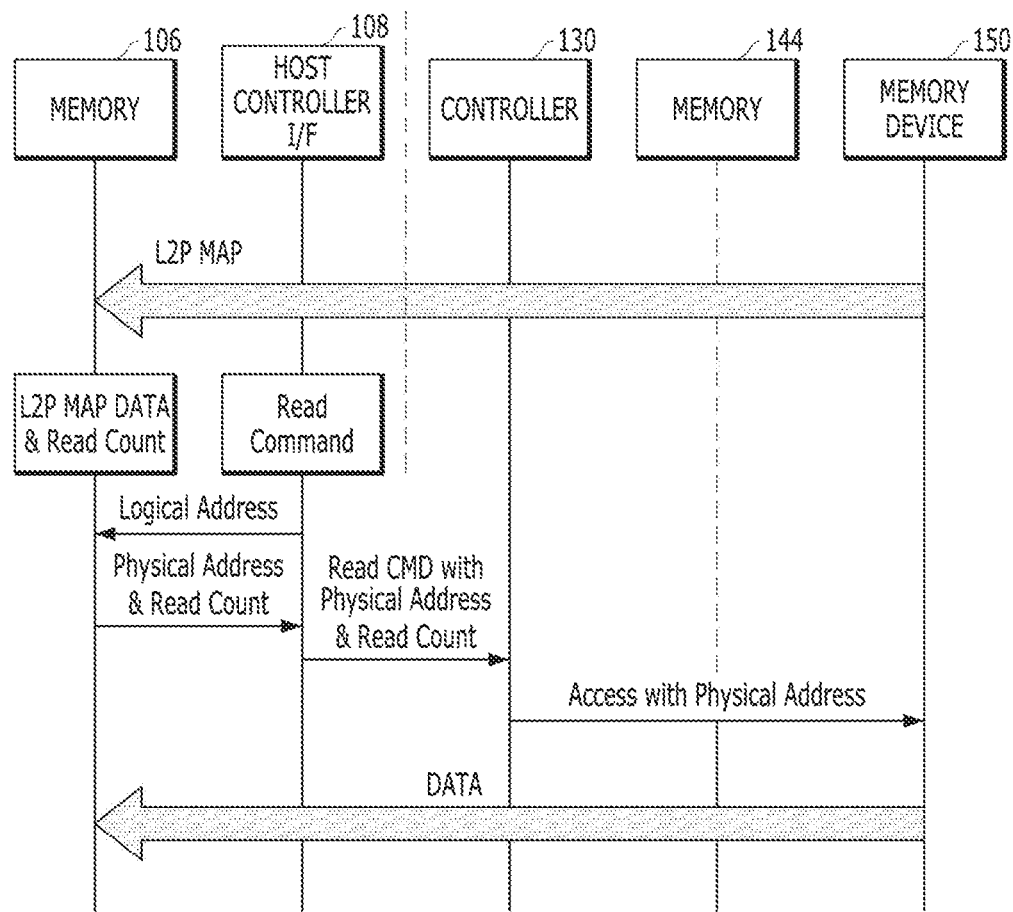
FIG. 4 is a diagram illustrating a read operation between the host and the memory system in the data processing system in accordance with the present embodiment.

FIG. 4 is a representation of an example of a diagram to assist in the explanation of a read operation of the host and the memory system in the data processing system in accordance with the embodiment of the disclosure.

Referring to FIG. 3, the host 102 may include a processor 104, memory 106, and a host controller interface 108. The memory system 110 may include a controller 130 and a memory device 150. Herein, the controller 130 and the memory device 150 described with reference to FIG. 3 may correspond to the controller 130 and the memory device 150 described with reference to FIG. 2.

Hereinafter, a difference between the controller 130 and the memory device 150 shown in FIG. 3 and the controller 130 and the memory device 150 shown in FIG. 2, which can technically be distinguished, is mainly described.

The host 102 may include the processor 104, which has a higher performance than that of the memory system 110, and the memory 106 which is capable of storing a larger amount of data than that of the memory system 110 that cooperates with the host 102. The processor 104 and the memory 106 in the host 102 can have an advantage in terms of space and upgradability. For example, the processor 104 and the memory 106 can have less of a space limitation than the processor 134 and the memory 144 in the memory system 110. The processor 104 and the memory 106 can be replaceable for upgrading their performance, which is distinguishable from the processor 134 and the memory 144 in the memory system 110. In the embodiment, the memory system 110 can utilize the resources possessed by the host 102 in order to increase the operation efficiency of the memory system 110.

As an amount of data which can be stored in the memory system 110 increases, an amount of map information corresponding to the data stored in the memory system 110 also increases. When storage capability used to load the map information in the memory 144 of the controller 130 is limited or restricted, the increase in an amount of loaded map information may cause an operational burden on operations of the controller 130. For example, because of limitation of space or region allocated for map information in the memory 144 of the controller 130, a part, but not all, of the map information may be loaded. If the loaded map information does not include specific map information for a physical location to which the host 102 is intended to access, the controller 130 must store the loaded map information back into the memory device 150 if some of the loaded map information has been updated, as well as load the specific map information for the physical location to which the host 102 is intended to access. These operations should be performed for the controller 130 to perform a read operation or a write operation required by the host 102, and may degrade performance of the memory system 110.

The read counts RD_CNT of the memory blocks 152, 154 and 156 included in the memory device 150 may be stored in a volatile state in the memory 144 within the controller 130 so as to be managed by the controller 130, and then stored in a nonvolatile state in the memory device 150 at each periodic check point. At this time, when the periodic check point is different from the performance point of the read operation on each of the memory blocks 152, 154 and 156, the read count RD_CNT may not be normally stored but lost, in the case that an SPO occurs in the memory system 110.

In an embodiment, the storage space of the memory 106 included in the host 102 may be several tens to several thousands times larger than that of the memory 144 which can be used by the controller 130. Furthermore, since the controller 130 can operate while receiving power more stably than the memory system 110, an SPO is less likely to occur than in the memory system 110.

The memory system 110 may transfer a map information and a read count 166 used by the controller 130 to the memory 106 in the host 102 so that at least some part of the memory 106 in the host 102 may be accessed by the memory system 110. The at least some part of the memory 106 can be used as a cache memory for address translation required for reading or writing data in the memory system 110. In this case, the host 102 translates a logical address into a physical address based on the map information 166 stored in the memory 106 before transmitting the logical address along with a request, a command, or an instruction to the memory system 110. Then, the host 102 can transmit the translated physical address and read count with the request, the command, or the instruction to the memory system 110. The memory system 110, which receives the translated physical address with the request, the command, or the instruction, may skip an internal process of translating the logical address into the physical address and access the memory device 150 based on the physical address transferred. Further, the memory system 110 may receive a read count having a more accurate value. In this case, an overhead (e.g., operational burden) of the controller 130 loading metadata from the memory device 150 for the address translation may be gone, and operational efficiency of the memory system 110 can be enhanced.

On the other hand, even if the memory system 110 transmits the map information and the read count 166 to the host 102, the memory system 110 can control mapping information based on the map information 166 such as map information generation, erase, update, and the like. The controller 130 in the memory system 110 may perform a predetermined operation PREDETERMINED OPERATION in FIG. 1 according to an operation state of the memory device 150 and may determine a physical address, i.e., which physical location in the memory device 150 data transferred from the host 102 is to be stored. Because a physical address of data stored in the memory device 150 may be changed and the host 102 has not recognized the changed physical address, the memory system 110 may control the map information 166 initiatively.

While the memory system 110 controls map information and read count used for the address translation, it can be determined that the memory system 110 needs to modify or update the map information and the read count 166 previously transmitted to the host 102. The memory system 110 can send a signal to the host 102 so as to request the update of the map information and the read count 166 stored in the host 102. The host 102 may update the stored map information and read count 166 in the memory 106 in response to a request delivered from the memory system 110. This allows the map information and the read count 166 stored in the memory 106 in the host 102 to be kept as the latest version such that, even though the host controller interface 108 uses the map information 166 stored in the memory 106, there is no problem in an operation that a logical address is translated into a physical address and the translated physical address is transmitted along with the logical address to the memory system 110.

Referring to FIGS. 1A to 3 together, the predetermined operation PREDETERMINED OPERATION that may be performed in the memory system 110 means an operation of moving valid data stored in at least one first memory block among the plurality of memory blocks 152, 154 and 156 included in the memory device 150, to at least one second memory block. For example, the predetermined operation may include a background operation such as garbage collection and wear leveling.

Meanwhile, the map information 166 stored in the memory 106 may include mapping information used for translating a logical address into a physical address. Referring to FIG. 3, map information associating a logical address with a physical address may include two distinguishable items: a logical/physical information item used for translating a logical address into a physical address; and a physical/logical information item used for translating a physical address into a logical address. Among them, the map information 166 stored in the memory 106 may include the logical/physical information. The physical/logical information can be primarily used for internal operations of the memory system 110, but might not be used for operations requested by the host 102 to store data in the memory system 110 or read data corresponding to a particular logical address from the memory system 110. Depending on an embodiment, the physical/logical information item might not be transmitted by the memory system 110 to the host 102.

The logical/physical information may correspond to the first map information L2P MAP INFO1 described above with reference to FIG. 2. The map information 166 stored in the memory 106 of the host 102 may correspond to the second map information L2P MAP INFO2 described above with reference to FIG. 2.

Meanwhile, the controller 130 in the memory system 110 can control (e.g., create, delete, update, etc.) the logical/physical information item or the physical/logical information item, and store either the logical information item or the physical information item to the memory device 150. Because the memory 106 in the host 102 is a type of volatile memory, the map information and the read count 166 stored in the memory 106 may disappear when an event such as interruption of power supply to the host 102 and the memory system 110 occurs. Accordingly, the controller 130 in the memory system 110 might not only keep the latest state of the map information and the read count 166 stored in the memory 106 of the host 102, but also store the latest state of the logical/physical information item or the physical/logical information item in the memory device 150.

Referring to FIGS. 3 and 4, an operation requested by the host 102 to read data stored in the memory system 110 is described when the map information and the read count 166 is stored in the memory 106 of the host 102.

Power is supplied to the host 102 and the memory system 110, and then the host 102 and the memory system 110 can be engaged with each other. When the host 102 and the memory system 110 cooperate, the map information (L2P MAP INFO) and the read count (RD_CNT) stored in the memory device 150 can be transferred to the host memory 106.

When a read command (Read CMD) is issued by the processor 104 in the host 102, the read command is transmitted to the host controller interface 108. After receiving the read command, the host controller interface 108 searches for a physical address corresponding to a logical address corresponding to the read command in the the map information (L2P MAP INFO) and the read count (RD_CNT) stored in the host memory 106. Based on the map information (L2P MAP INFO) and the read count (RD_CNT) stored in the host memory 106, the host controller interface 108 can recognize the read count corresponding to the physical address corresponding to the logical address. The host controller interface 108 carries out an address translation for the logical address associated with the read command.

The host controller interface 108 transfers the read command (Read CMD) with the logical address as well as the read count corresponding to the physical address into the controller 130 of the memory system 110. The controller 130 can access the memory device 150 based on the physical address entered with the read command. Data stored at a location corresponding to the physical address in the memory device 150 can be transferred to the host memory 106 in response to the read command (Read CMD).

An operation of reading data stored in the memory device 150 including a nonvolatile memory may take more time than an operation of reading data stored in the host memory 106 or the like which is a volatile memory. In the above-described operation for handling the read command (Read CMD), the controller 130 may skip or omit an address translation corresponding to the logical address entered from the host 102 (e.g., searching for and recognizing a physical address associated with the logical address). For example, in the address translation, the controller 130 might not have to load map information from the memory device 150 or replace the metadata stored in the memory 144 when the controller 130 cannot find map information for the address translation in the memory 144. This allows the memory system 110 to perform a read operation requested by the host 102 more quickly.

Figure 5:
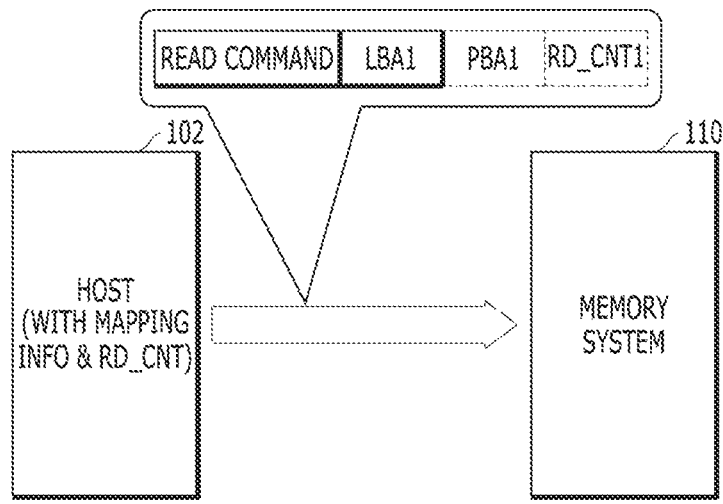
FIG. 5 is a diagram illustrating a first example of a transaction between the host and the memory system in the data processing system in accordance with the present embodiment.

FIG. 5 is a diagram illustrating a first example of a transaction between the host and the memory system in the data processing system in accordance with the present embodiment.

FIG. 5 illustrates the format of the read command RD_CMD transferred to the memory system 110 from the host 102, which has described with reference to FIGS. 1A and 1B.

Specifically, referring to FIGS. 1A, 1B and 5, the host 102 which stores the map information MAP_INFO and the read count RD_CNT may send a read command READ COMMAND with a first logical address LBA1, a first physical address PBA1 and a first read count RD_CNT1 to the memory system 110. When the first physical address PBA1 corresponding to the first logical address LBA1 corresponding to the read command READ COMMAND is present in the map information stored in the host 102, the host 102 may transmit the read command READ COMMAND including the first logical address LBA1, the first physical address PBA1, and the first read count RD_CNT1 corresponding to the first physical address PBA1, to the memory system 110. However, when the physical address PBA corresponding to the logical address LBA corresponding to the read command READ COMMAND is not present in the map information stored in the host 102, the host 102 may transmit the read command READ COMMAND including only the logical address LBA without the physical address PBA, to the memory system 110.

Figure 6:
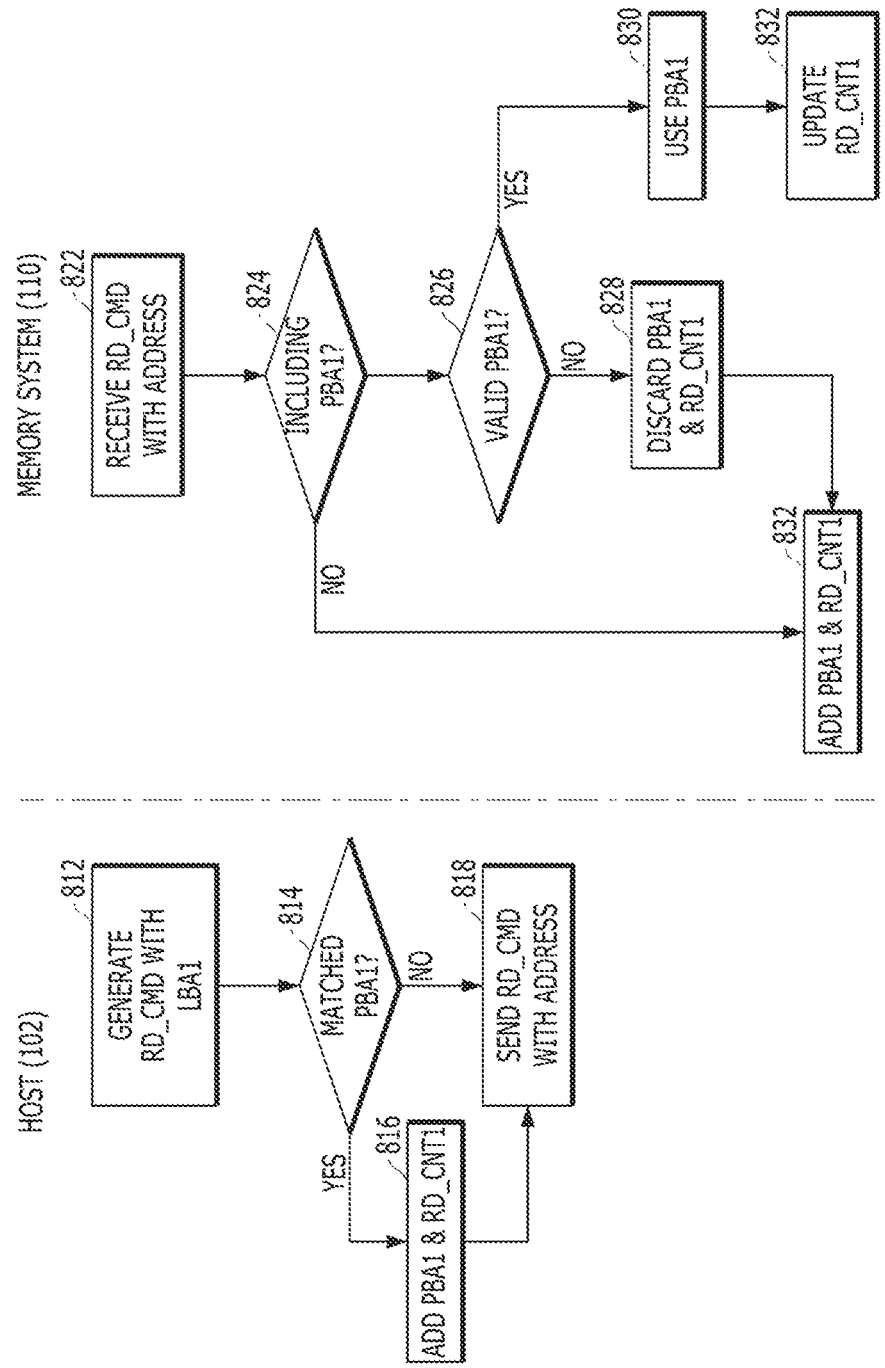
FIG. 6 is a flowchart illustrating a first operation between the host and the memory system in accordance with the present embodiment.

FIG. 6 is a flowchart illustrating a first operation between the host and the memory system in accordance with the present embodiment.

Specifically, FIG. 6 illustrates a process in which the read command RD_CMD sent to the memory system 110 from the host 102, which has been described with reference to FIGS. 1A, 1B and 5, is generated by the host 102 and processed by the memory system 110.

Specifically, referring to FIGS. 1A, 1B, 5 and 6, the host 102 may generate the read command RD_CMD including the first logical address LBA1 in step 812. Then, the host 102 may check whether the first physical address PBA1 corresponding to the first logical address LBA1 is present in the map information, in step 814. When the first physical address PBA1 is not present (NO in step 814), the host 102 may send the read command RD_CMD with only the first logical address LBA1 in step 818.

On the other hand, when the first physical address PBA1 is present (YES in step 814), the host 102 may add the first physical address PBA1 and the first read count RD_CNT1 corresponding to the first physical address PBA1 to the read command RD_CMD with the first logical address LBA1, in step 816. That is, the host 102 may send the read command RD_CMD with the first logical address LBA1, the first physical address PBA1 and the first read count RD_CNT1 in step 818.

The memory system 110 may receive the read command RD_CMD sent from the host 102 in step 822. The memory system 110 may check whether the first physical address PBA1 is included in the received read command RD_CMD, in step 824. If the first physical address PBA1 is not included in the received command (NO in step 824), the memory system 110 may search the second physical address PBA2 corresponding to the first logical address LBA1 included in the received read command RD_CMD, in step 832.

If the first physical address PBA1 is included in the received read command RD_CMD (YES in step 824), the memory system 110 may check whether the first physical address PBA1 is valid, in step 826. The memory system 110 may send the map information L2P MAP INFO and the read count RD_CNT to the host 102, and the host 102 may perform mapping based on the map information L2P MAP INFO and the read count RD_CNT sent by the memory system 110, and send the read command RD_CMD with the first physical address PBA1 and the first read count RD_CNT1. However, after the memory system 110 sends the map information L2P MAP INFO and the read count RD_CNT to the host 102, the map information managed by the memory system 110 may be changed and updated. For this reason, when the map information stored in the host 102 is dirty, the first physical address PBA1 sent by the host 102 cannot be used as it is. Therefore, the memory system 110 may determine whether the first physical address PBA1 included in the received read command RD_CMD is valid. When the first physical address PBA1 included in the received read command RD_CMD is valid (YES in step 826), the memory system 110 may read data from the memory device 150 using the first physical address PBA1 in step 830, and update the first read count RD_CNT1 in step S832.

When the first physical address PBA1 included in the received read command RD_CMD is invalid (NO in step 826), the memory system 110 may discard the first physical address PBA1 and the first read count RD_CNT1 which are included in the received read command RD_CMD, in step 828. In this case, the memory system 110 may search the second physical address PBA1 based on the first logical address LBA1 included in the received read command RD_CMD in step 832.

Figure 7A:
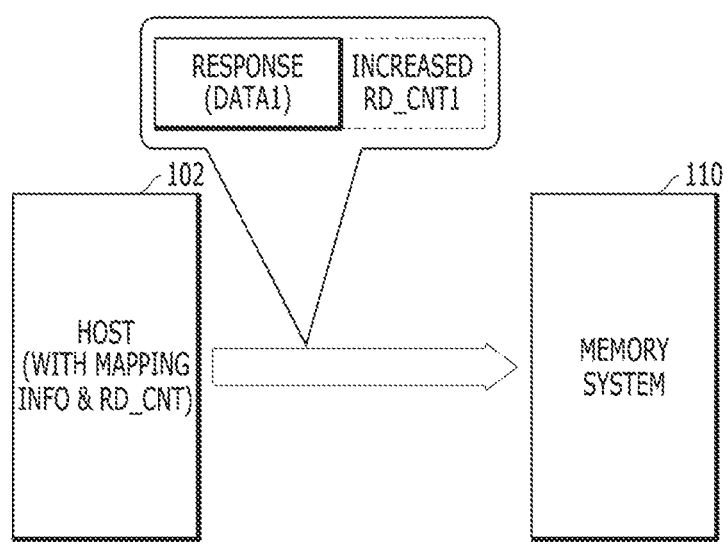
FIGS. 7A and 7B are diagrams illustrating a second example of the transaction between the host and the memory system in the data processing system in accordance with the embodiment.
Figure 7B:
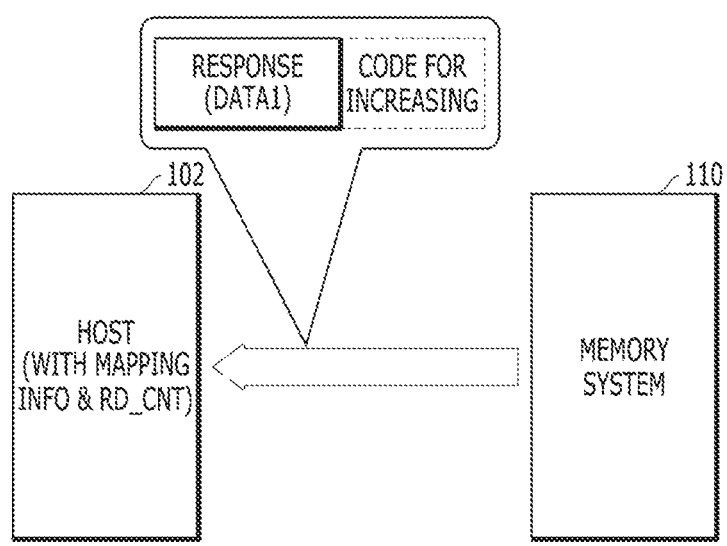

FIGS. 7A and 7B are diagrams illustrating a second example of the transaction between the host and the memory system in the data processing system in accordance with the embodiment.

FIGS. 7A and 7B illustrate the format of the response RESPONSE to the read command RD_CMD, which is transmitted to the host 102 from the memory system 110 and has been described with reference to FIG. 1A.

Specifically, referring to FIGS. 1A, 7A and 7B, the memory system 110 may include the first data DATA1 and the updated value UPDATED of the first read count RD_CNT1 in the response RESPONSE to the read command RD_CMD inputted from the host 102, and send the response RESPONSE with the first data DATA1 and the update value UPDATED of the first read count RD_CNT1 to the host 102.

FIG. 7A illustrates the case in which the updated value UPDATED of the first read count RD_CNT1 is a first read count INCREASED RD_CNT1 increased by a preset value. Therefore, the memory system 110 may include the first data DATA1 and the first read count INCREASED RD_CNT1 increased by the preset value in the response RESPONSE to the read command RD_CMD inputted from the host 102, and send the response RESPONSE with the first data DATA1 and the increased first read count INCREASED RD_CNT1 to the host 102.

FIG. 7B illustrates the case in which the updated value UPDATED of the first read count RD_CNT1 is a code for increasing the value of the first read count RD_CNT1 by a preset value. Therefore, the memory system 110 may include the first data DATA1 and the code CODE FOR INCREASING for increasing the value of the first read count RD_CNT1 by a preset value in the response RESPONSE to the read command RD_CMD inputted from the host 102, and send the response RESPONSE with the first data DATA1 and the code CODE FOR INCREASING to the host 102.

Figure 8:
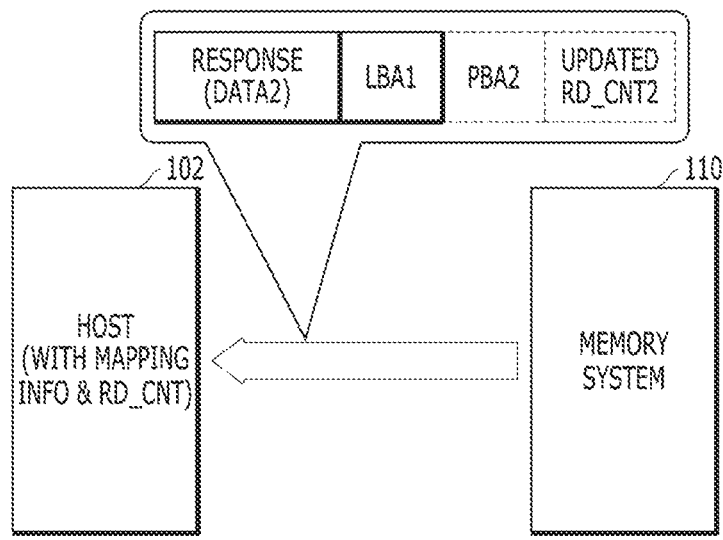
FIG. 8 is a diagram illustrating a third example of the transaction between the host and the memory system in the data processing system in accordance with the embodiment.

FIG. 8 is a diagram illustrating a third example of the transaction between the host and the memory system in the data processing system in accordance with the embodiment.

FIG. 8 illustrates the format of the response RESPONSE to the read command RD_CMD, which is transmitted to the host 102 from the memory system 110 and has been described with reference to FIG. 1B.

Specifically, referring to FIGS. 1B and 8, the memory system 110 may include the second data DATA2, the first logical address LBA1, the second physical address PBA2 and the second read count RD_CNT2 in the response RESPONSE to the read command RD_CMD inputted from the host 102, and send the response with the second data DATA2, the first logical address LBA1, the second physical address PBA2 and the second read count RD_CNT2 to the host 102.

Figure 9:
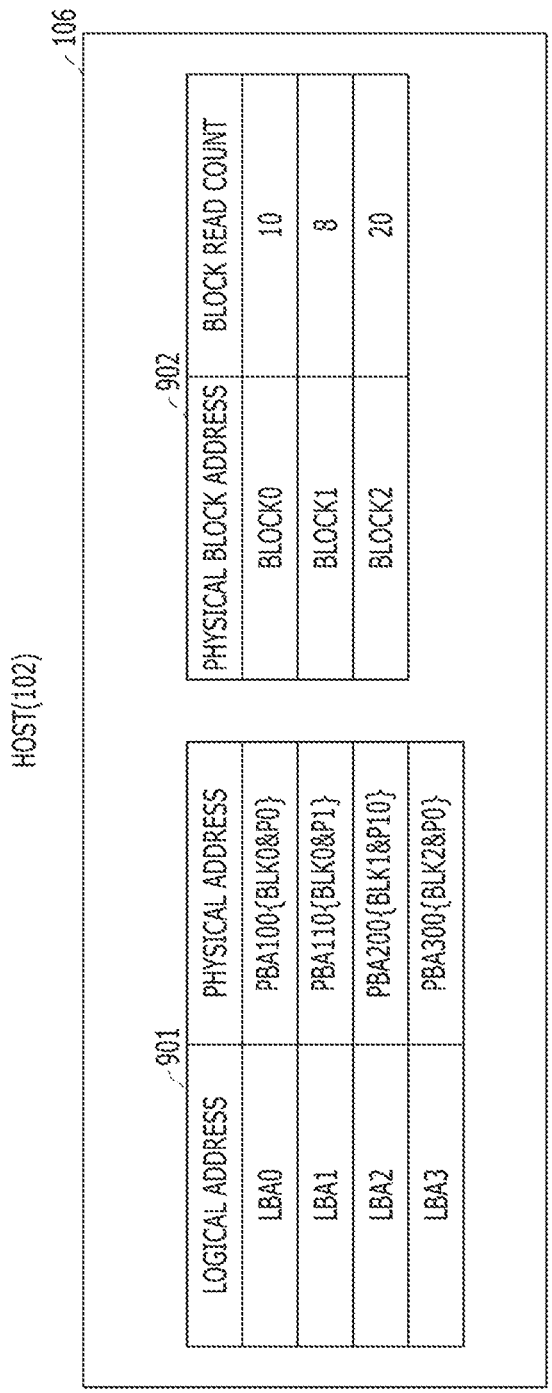
FIG. 9 is a diagram illustrating an example of the host including an internal memory in accordance with the present embodiment.

FIG. 9 is a diagram illustrating an example of the host including the internal memory in accordance with the embodiment.

FIGS. 1A, 1B, 2 and 9 show a method in which the host 102 manages the map information L2P MAP INFO and the read count RD_CNT inputted from the memory system 110.

First, the memory device 150 may include the plurality of memory blocks 152, 154 and 156, and each of the memory blocks 152, 154 and 156 may include the plurality of pages. At this time, physical addresses of the memory device 150 may include block physical addresses for identifying the memory blocks 152, 154 and 156 and page physical addresses for identifying the pages. For example, as illustrated in FIG. 9, a 100th physical address PBA100 corresponding to a zeroth logical address LBA0 may indicate a combination of a block physical address indicating a zeroth memory block BLK0 and a page physical address indicating a zeroth page P0. Furthermore, a 110th physical address PBA110 corresponding to a first logical address LBA1 may indicate a combination of the block physical address indicating the zeroth memory block BLK0 and a page physical address indicating a first page P1. Furthermore, a 200th physical address PBA200 corresponding to a second logical address LBA2 may indicate a combination of a block physical address indicating a first memory block BLK1 and a page physical address indicating a tenth page P10. Furthermore, a 300th physical address PBA300 corresponding to a third logical address LBA3 may indicate a combination of a block physical address indicating a second memory block BLK2 and the page physical address indicating the zeroth page P0.

When receiving the map information L2P MAP INFO and the read count RD_CNT corresponding to the map information L2P MAP INFO from the memory system 110, the host 102 may store the received map information L2P MAP INFO in the internal memory 106 as it is (901). Furthermore, the host 102 may generate read count information 902 for managing read counts on a memory block basis by referring to the block physical address included in the physical address of the map information L2P MAP INFO, and store the read count information 902 in the internal memory 106.

The reason why the host 102 separately stores the map information L2P MAP INFO and the read count RD_CNT is that the map information L2P MAP INFO is sorted on a page basis, but the read count RD_CNT is sorted on a block basis. For example, FIG. 9 illustrates that since the zeroth logical address LBA0 and the first logical address LBA1 are all mapped to the physical address indicating the zeroth memory block BLK0, the read count corresponding to the zeroth memory block BLK0 may correspond to a value obtained by adding up the read count of the 100th physical address PBA100 mapped to the zeroth logical address LBA0 and the read count of the 110th physical address PBA110 mapped to the first logical address LBA1.

In accordance with the embodiments, the memory system may transmit the read counts of the memory blocks included therein to the host or computing device to manage the read counts. Therefore, even when an SPO occurs in the memory system, the host or computing device can accurately recover the read counts of the memory blocks included in the memory system based on the read counts stored in the host or the computing device. Therefore, it is possible to prevent a background operation which may be unnecessarily performed based on the read counts in the memory system, thereby improving the operation performance of the memory system.

Although various embodiments have been described for illustrative purposes, it will be apparent to those skilled in the art that various changes and modifications may be made without departing from the spirit and scope of the invention as defined in the following claims.

What is claimed is:

1. A memory system, comprising:
   a nonvolatile memory device including a plurality of memory blocks; and
   a controller for reading data stored in a physical address in response to a read command from a host, the read command including a first logical address, a first physical address corresponding to the first logical address, and a first read count associated with the first physical address,
   wherein the controller reads first data from a first block corresponding to the first physical address and sends a response to the read command to the host, the response including the first data and updated information relating to the first read count.

2. The memory system of claim 1, wherein when the first physical address is valid, the controller reads the first data from the first block corresponding to the first physical address,
   wherein when the first physical address is invalid, the controller discards the first physical address and the first read count, searches a second physical address corresponding to the first logical address, reads second data from a second block corresponding to the second physical address, generates a second read count by updating a read count of the second block, and sends a response to the read command to the host, the response including the second data, the second read count and updated map information obtained by associating the first logical address with the second physical address.

3. The memory system of claim 2, wherein when a write command with a second logical address and write data is received from the host, the controller generates first map information by associating the second logical address with a physical address for storing the write data, and sends second map information of the first map information and a read count of a memory block corresponding to the second map information to the host in response to a map transfer command from the host.

4. The memory system of claim 1, wherein the updated information is a value of the first read count that is increased.

5. The memory system of claim 1, wherein the updated information is a code indicating that a value of the first read count has increased.

6. A data processing system, comprising:
a host for sending a read command including a first read count and a first physical address corresponding to a first logical address; and
a memory system including a nonvolatile memory device having a plurality of memory blocks, the memory system being configured to read data from a physical address in response to a read command from a host, the read command including a first logical address, a first physical address corresponding to the first logical address, and a first read count associated with the first physical address,
wherein the memory system reads first data from a first block corresponding to the first physical address and sends a response to the read command to the host, the response including the first data and updated information of the first read count.

7. The data processing system of claim 6, wherein when the first physical address is valid, the memory system reads the first data from the first block corresponding to the first physical address,
wherein when the first physical address is invalid, the memory system discards the first physical address and the first read count, searches a second physical address corresponding to the first logical address, reads second data from a second block corresponding to the second physical address, generates a second read count by updating a read count of the second block, and sends a response to the read command to the host, the response including the second data, the second read count and updated map information obtained by associating the first logical address with the second physical address.

8. The data processing system of claim 6, wherein when a write command with a second logical address and write data is received from the host, the memory system generates first map information by associating the second logical address with a physical address for storing the write data, and sends at least a portion of second map information of the first map information and a read count of a memory block corresponding to the second map information to the host in response to a map transfer command from the host.

9. The data processing system of claim 8, wherein when the first physical address is valid, the memory system reads the first data from the first block corresponding to the first physical address, and wherein when the first physical address is invalid, the memory system discards the first physical address and the first read count, searches a second physical address corresponding to the first logical address by referring to the first map information, reads second data from a second block corresponding to the second physical address, generates a second read count by updating a read count of the second block, and includes the second data, the second read count, and updated map information obtained by associating the first logical address with the second physical address in the response to the read command and sends the response with the second data, the second read count and the updated map information to the host.

10. The data processing system of claim 9, wherein the host comprises an internal memory, the host configured to generate the map transfer command, sends the map transfer command to the memory system, and store, in the internal memory, the second map information included in a response to the map transfer command received from the memory system and the read count of the memory block corresponding to the second map information.

11. The data processing system of claim 10, wherein the updated information is the value of the first read count that is increased in response to performing the read command in the memory system, and
wherein the host selects the first logical address, the first physical address and the first read count by referring to the second map information stored in the internal memory, sends the read command with the first logical address, the first physical address and the first read count to the memory system, and changes the value of the first read count corresponding to the first physical address stored in the internal memory into the updated information, when the first data and the updated information are included in the response to the read command from the memory system.

12. The data processing system of claim 10, wherein the updated information is a code for informing the host that the value of the first read count has been increased in response to performing the read command in the memory system, and
wherein the host selects the first logical address, the first physical address and the first read count by referring to the second map information stored in the internal memory, sends the read command with the first logical address, the first physical address and the first read count to the memory system, and increases the value of the first read count corresponding to the first physical address stored in the internal memory by a value corresponding to the updated information, when the first data and the updated information are included in the response to the read command received from the memory system.

13. The data processing system of claim 10, wherein the host selects the first logical address, the first physical address and the first read count by referring to the second map information stored in the internal memory, sends the read command with the first logical address, the first physical address and the first read count to the memory system, and updates the second map information stored in the internal memory by referring to the updated map information, such that the first logical address is associated with the second physical address, when the second data, the second read count and the updated map information are included in the response to the read command received from the memory system, and associates the second read count with the second physical address and stores the second read count in the internal memory.

14. The data processing system of claim 10, wherein the memory block comprises a plurality of pages, and a physical address of the nonvolatile memory device comprises a block physical address for identifying the memory block and a page physical address for identifying the page, and
wherein the host generates read count information for managing the read count of the memory block by referring to a block physical address included in a physical address of the second map information stored in the internal memory, and stores the generated read count information in the internal memory.

15. A method for operating a memory system, the method comprising:
reading data from a block in a non-volatile memory device in response to a read command received from a host, the read command including a first logical address, a first physical address, and a first read count associated with the first physical address; and
sending a response to the read command to the host, the response including the data and information associated with a read count for the block.

16. The method of claim 15, further comprising:
determining whether the first physical address is valid,
wherein when the first physical address is valid, the data included in the response is first data read from a first block corresponding to the first physical address, and the information is updated information relating to the first read count.

17. The operating method of claim 16, wherein when the first physical address is invalid, the method further comprises:
searching for a second physical address corresponding to the first logical address;
reading second data from a second block corresponding to the second physical address; and
generating a second read count by updating a read count of the second block,
wherein the data included in the response is the second data read from the second block and the information is the second read count, the response further including map information obtained by associating the first logical address with the second physical address.

18. The method of claim 17, further comprising:
generating first map information by associating a second logical address with a physical address of the nonvolatile memory device for storing write data in response to a write command from the host, the write command including the second logical address and the write data; and
sending some second map information of the first map information and a read count of a memory block corresponding to the second map information to the host in response to a map transfer command from the host.

19. The method of claim 16, wherein the information is a value of the first read count that is increased.

20. The method of claim 16, wherein the information is a code informing the host that a value of the first read count has been increased.

* * * * *